(12) United States Patent
Kath et al.

(10) Patent No.: US 6,462,849 B1
(45) Date of Patent: Oct. 8, 2002

(54) OPTIMIZING LAUNCH POINTS FOR DISPERSION-MANAGED SOLITONS

(75) Inventors: William L. Kath; Tian-Siang Yang, both of Evanston, IL (US); Sergei K. Turitsyn, Dusseldorf (DE)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 09/151,387

(22) Filed: Sep. 10, 1998

(51) Int. Cl.[7] .............................................. H04B 10/00

(52) U.S. Cl. ........................................ 359/161; 385/24

(58) Field of Search ................................ 359/124, 161, 359/173, 179; 385/24, 27, 31, 115, 122, 123; 372/6

(56) References Cited

U.S. PATENT DOCUMENTS

| | | | | |
|---|---|---|---|---|
| 5,140,656 A | | 8/1992 | Hasegawa et al. ............. 385/24 |
| 5,471,333 A | | 11/1995 | Taga et al. .................. 359/173 |
| 5,504,829 A | * | 4/1996 | Evans et al. ................ 385/123 |
| 5,508,845 A | | 4/1996 | Frisken ....................... 359/161 |
| 5,559,920 A | * | 9/1996 | Chraplyvy et al. ......... 385/123 |
| 5,574,590 A | | 11/1996 | Edagawa et al. ........... 359/179 |
| 5,612,808 A | | 3/1997 | Audouin et al. ............ 359/161 |
| 5,642,215 A | | 6/1997 | Suzuki et al. ............... 359/161 |
| 5,737,460 A | * | 4/1998 | Damen et al. ................ 385/24 |
| 5,877,879 A | * | 3/1999 | Naito ..................... 359/161 X |
| 6,137,604 A | * | 10/2000 | Bergano ...................... 359/124 |

FOREIGN PATENT DOCUMENTS

WO        13588     *  3/1999

OTHER PUBLICATIONS

Devaney Et Al., "WDM of Enhanced Power Solitons in Strongly Dispersion-Managed Systems", Conference on Optical Fiber Communications Technical Digest, vol. 6, Feb. 1997.*

Yang Et Al., "Optimal Dispersion Maps for Wavelength-Division-Multiplexed Soliton-Transmission", Optics Letters, vol. 23, No. 8, pp. 597-599, Apr. 1998.*

Charbonnier et al., Continuum Generated by Chromatic Dispersion and Power Variations in Periodically Amplified Solition Links. *Optics Letters,* (1996) vol. 21, No. 16, p. 1232-1234.

Charbonnier et al., Reduction of the Dispersive Wave in Periodically Amplified Links with Initially Chirped Solutions. *IEEE Photonics Technology Letters,* (1997) vol. 9, No. 1, p. 127-129.

Kodama et al., Optimal Design of Dispersion Management for a Solition-Wavelength-Division-Multiplexed System. *Optic Letters,* (1997) vol. 22, No. 22, pp. 1692-1694.

Guen et al. 200Gbit/s 100km-span Soliton WDM Transmission over 1000 km of Standard Fiber with Dispersion Compensation and Pre-Chirping. Optical Fiber Communications Conf., (1997) Post Deadline Paper, p. PD17-1-PD17-3.

Wald et al., Optimization of Soliton Transmission in Dispersion-Managed Fibers Links, *Optics Cummunications,* 145 (1998) 48-52.

* cited by examiner

*Primary Examiner*—Thomas Mullen
(74) *Attorney, Agent, or Firm*—Welsh & Katz. Ltd.

(57) ABSTRACT

There is described an asymptotic theory for predicting the evolution of dispersion-managed solitons with loss and gain. Optimal launch points for dispersion-managed solitons where the pulses do not need to be prechirped can be readily located. Numerical results demonstrate that launching the pulses with proper phase chirp and power significantly reduces pulse amplitude and width oscillations and the amount of dispersive radiation, without regard to wavelength.

9 Claims, 4 Drawing Sheets

OPTIMIZING LAUNCH POINTS FOR DISPERSION-MANAGED SOLITONS

This invention is made with government support under Grant No. F49620-97-1-0008 awarded by the Air Force Office of Scientific Research (Air Force Materials Command, USAF) and Grant No. DMS-9500615 awarded by the National Science Foundation. The government has certain rights in the invention.

BACKGROUND OF THE INVENTION

The present invention relates to a transmission system using optical fibers and, more particularly, to a long-distance, large-capacity optical transmission system employing return-to-zero lightwave pulses, such as soliton lightwave pulses, and optical amplifiers.

With the development of optical amplifying techniques, optical fiber communication technology has made rapid-paced progress toward ultra-long-distance communication, now allowing implementation of a long-range communication system without the need of using regenerative repeaters. At increased transmission rates, however, conventional transmission systems suffer serious degradation of their transmission characteristics caused by the wavelength dispersion and nonlinear effect of optical fibers, imposing severe limitations on the realization of a high-speed, high-capacity transmission system.

Usually, when lightwave pulses are transmitted over an optical fiber, their pulse width broadens by the wavelength dispersion characteristic of the optical fiber owing to the frequency spread inherent in data-modulated lightwave pulses. The freedom of a soliton lightwave signal from variation in its pulse waveform by transmission is achieved when the pulse width compression, caused by frequency chirping of the lightwave pulses owing to optical nonlinearities of the optical fiber forming the transmission line, balances with the aforementioned pulse width broadening. To accomplish an optical soliton transmission which maintains the above-mentioned balance and is substantially free from variations in the lightwave pulse waveform, it is necessary that the zero dispersion wavelength of the transmission line be shorter than the wavelength of the lightwave signal to hold a desired (anomalous) wavelength dispersion characteristic.

In an optical soliton transmission which is generally free from waveform degradation by transmission, timing jitter brought about by various causes during transmission is a main factor determining the transmission characteristic, along with degradation of the signal to noise ratio by accumulated optical noises. The Gordon-Haus jitter forms a main part of such timing jitter. In an optically amplified transmission system, the optical soliton carrier frequency which randomly fluctuates due to optical noises produced by optical repeater-amplifiers, is converted mainly by the wavelength dispersion characteristic of the fiber optic transmission line into fluctuations in the system. The Gordon-Haus jitter increases with distance and, hence, exerts a great influence on long-distance soliton transmission. The pulse spacing reduced by the Gordon-Haus jitter also increases the interaction between adjacent optical soliton pulses, newly causing timing jitter. Thus, the Gordon-Haus jitter is an important problem which must be solved in order to transmit long distances.

Since the amount of Gordon-Haus jitter is proportional to the group-velocity dispersion present in the transmission line, decreasing the fiber's average dispersion reduces the timing jitter. This leads to additional complications, however, as distortions due to four-wave mixing become more pronounced at low dispersion values.

Dispersion management has proven to be an effective technique to reduce both effects simultaneously. The idea of dispersion management is to concatenate fibers of both normal and anomalous dispersion to form a transmission line having both a high local group-velocity dispersion (GVD) and a low path-averaged GVD. This is beneficial since high local dispersion significantly reduces the efficiency of four-wave mixing, decreasing both the modulational instability gain and bandwidth. In addition, lowering the average dispersion also reduces the Gordon-Haus timing jitter of soliton transmission systems. Furthermore, dispersion management has been found to enhance the soliton energy; this additionally reduces the timing jitter below the amount that would be obtained in a system with constant dispersion equal to the path-averaged value.

In high-rate terrestrial soliton transmission systems, intersymbol interference produced by the generation of dispersive waves (or, continuum radiation) shed by propagating pulses is a major limitation. It is therefore important to diminish the shedding of energy from the input pulse into a dispersive pedestal, which can be achieved by launching properly shaped and chirped pulses with optimum power into the fiber. In practice, typical optical sources generate unchirped pulses and input pulse chirping is realized by using an additional piece of fiber preceding the beginning of the transmission line. It is therefore convenient to identify points in each dispersion-map period where pulses are naturally unchirped, and use one such location as the launch point. The partial map period preceding the first complete map period then plays the role of the prechirping fiber.

SUMMARY OF THE INVENTION

Therefore, an object of the subject invention is an efficient, fiber-optic communication system.

A further object of the subject invention is a manner of optimizing a dispersion map for use in decreasing dispersive radiation in a fiber-optic system.

These and other objects are attained by the subject invention, which includes dispersion maps with zero-chirp point positions independent of the dispersion values of the types of fiber comprising the map. A zero-chirp point can be used as a special launching point for optical pulses; the subsequent evolution of the pulses is much cleaner than if other launching points are used since there is less dispersive radiation shed by the pulse as it evolves. Because these optimized dispersion maps identify zero-chirp launching points which are independent of the dispersion values of the types of fiber comprising the map, the launching points are, therefore, also independent of the wavelength since the second-order dispersion varies with wavelength. As a result, such a dispersion map allows minimal shedding of dispersive radiation at several frequencies simultaneously, a situation that is ideal for wavelength-division-multiplexing. With this optimized map, one need only choose the appropriate length of the fiber segments, locate the zero chirp point, and cut the combined fiber segments at the zero-chirp point location to form an optimal prechirping fiber. Optimum lengths are chosen by using a theoretical estimate for the imbalance between the effects of the group velocity dispersion and nonlinear index of refraction.

DESCRIPTION OF THE PREFERRED EMBODIMENTS

It is fundamental that any signal must have more than one frequency present in order to carry information. Dispersion is the effect that occurs when the propagation speed is dependent upon frequency; this process tends to break up signals and can pose a severe limitation upon the information capacity of optical communication systems. There are several techniques that have been proposed to alleviate this difficulty. For traditional, low-intensity information encoding schemes, it is possible to work near the zero-dispersion point of optical fibers (at either 1.3 microns for standard single mode fiber or 1.5 microns for dispersion shifted fiber). Near the zero dispersion point, however, other effects such as four-wave mixing tend to degrade the signal. In such situations, dispersion management can be particularly helpful.

Another technique to alleviate the effects of dispersion is to encode the information using optical solitons. Optical solitons exploit the intensity-dependent index of refraction to compensate the dispersion. Essentially, the intensity-dependent refractive index produces an intensity-dependent pulse phase velocity, which can compensate for the frequency-dependent velocity produced by the group velocity dispersion. In this way, it is possible in theory to produce an optical pulse which can propagate for thousands of kilometers without significant distortion in an optically amplified transmission system.

Figure 1:
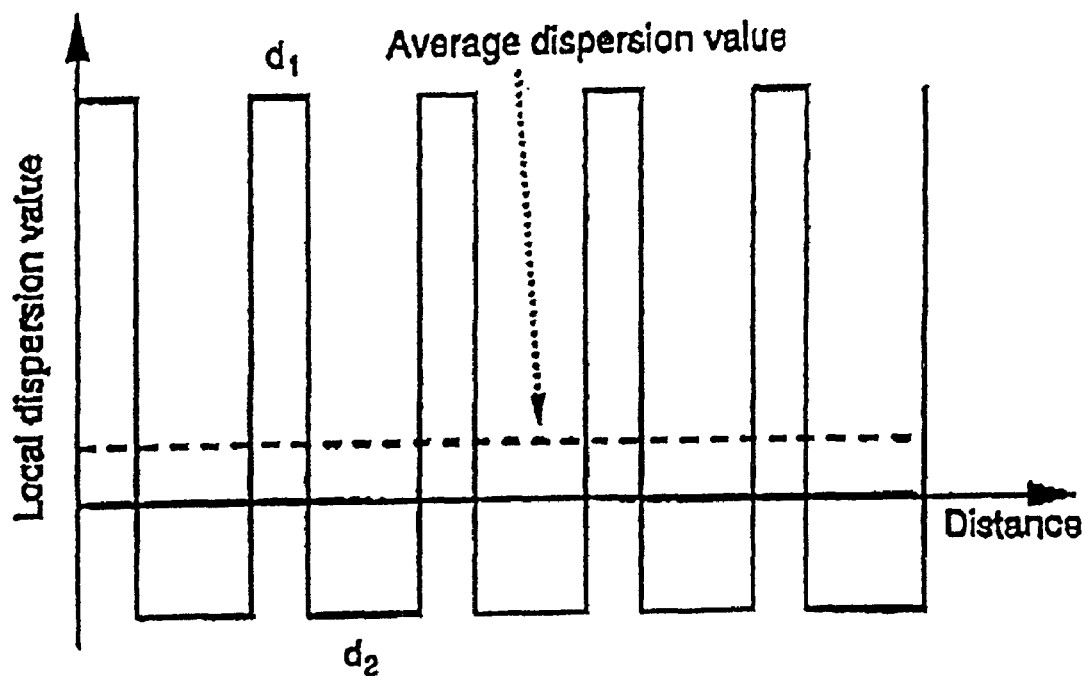
FIG. 1 is a dispersion profile of a lightwave system which uses dispersion management.

In practice, other effects such as four-wave mixing also distort solitons and degrade the performance of systems employing them. Dispersion management has been shown to significantly improve the performance of soliton-based communication systems. Dispersion management arises when fibers with different dispersion parameters are concatenated to form a transmission line that has both low path-averaged group velocity dispersion and high local group velocity dispersion, as shown in FIG. 1.

Figure 2:
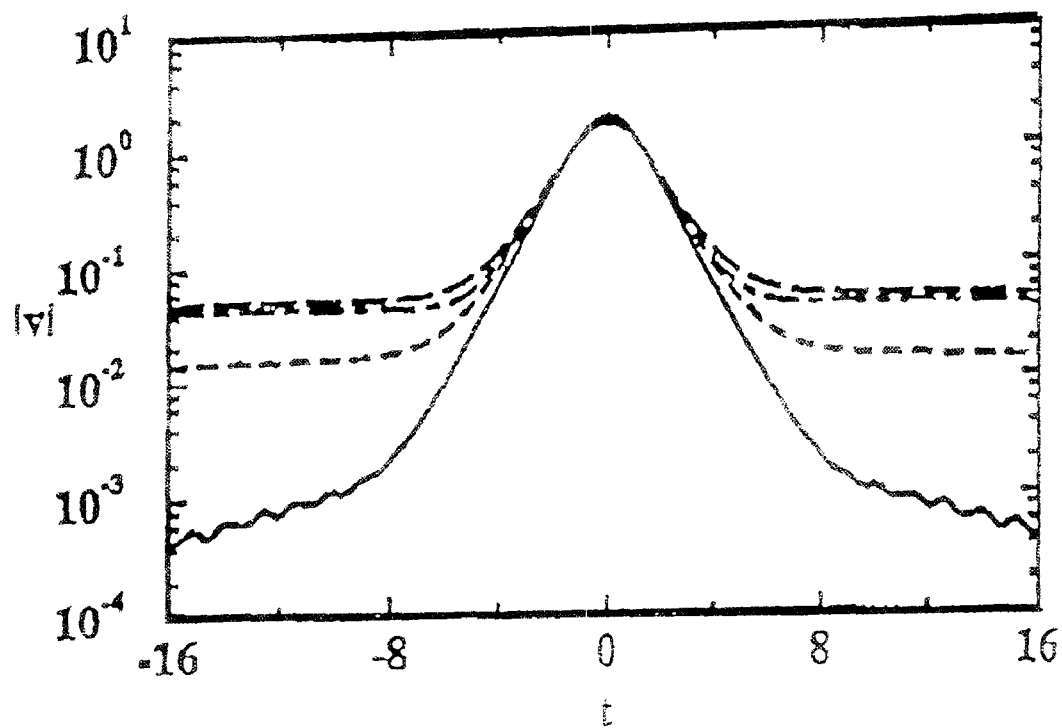
FIG. 2 is a pulse profile showing the reduction in the amount of dispersive radiation shed when a zero-chirp launch point is used (solid and dashed lines) versus other launching points (dot-dashed lines and long dashed lines).

Optimizing dispersion managed systems is also desirable. In high bit-rate terrestrial soliton communication systems, for example, the generation of dispersive radiation by non-ideal starting conditions imposes a limit on the amplifier spacing. It is beneficial, therefore, to minimize the amount of dispersive radiation by either pre-chirping the pulses or by launching the pulses at the zero-chirp point of the dispersion map as shown in FIG. 2.

Figure 3:
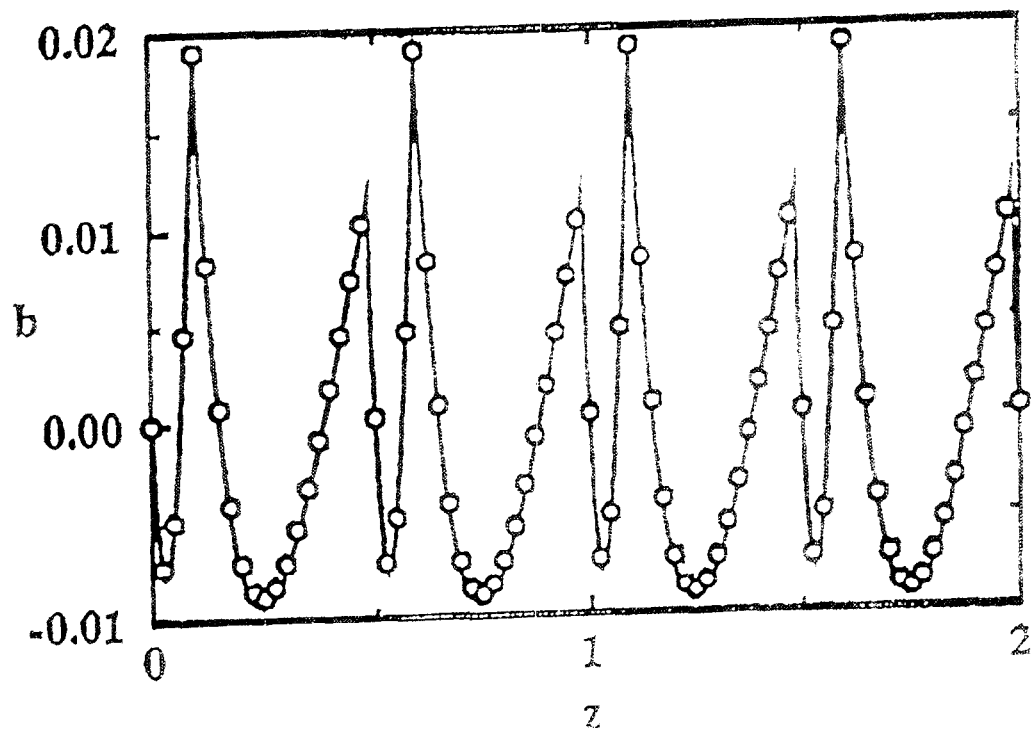
FIG. 3 is a chirp produced in a dispersion managed system showing the local imbalance between linear dispersion and the nonlinear refractive index.

The chirp can be explained as an imbalance between the phase advance produced by the nonlinear index of refraction and the linear dispersion. In a dispersion-managed soliton, these balance on average, but in one part of the fiber the dispersion will be too small and the nonlinear index will dominate, while in another part of the fiber the dispersion will be larger and will dominate. An example of this is shown in FIG. 3. A zero-chirp point is a point at which the accumulations of the two effects are locally balanced.

One difficulty of using such dispersion maps is when one considers wavelength-division-multiplexed (WDM) systems. WDM systems employ two or more channels operating at different wavelengths to increase the total system capacity. Since the group-velocity dispersion parameter of an optical fiber depends upon wavelength or frequency, this means that a dispersion map's parameters will be different for each channel. This can necessitate independently adjusting and modulating each channel's laser transmitter to pre-chirp each channel to compensate for the differences.

Figure 4:
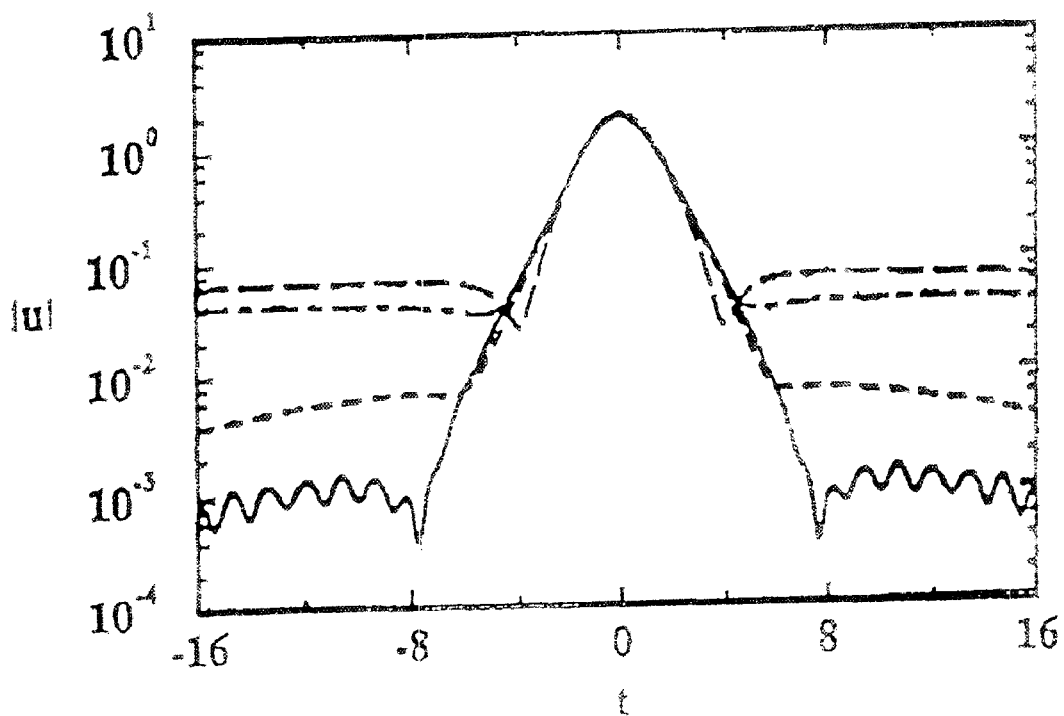
FIG. 4 is a pulse profile showing that the reduction in the amount of dispersive radiation shed can be optimized at two different frequencies when a specially-chosen dispersion map is used (solid and dashed lines) versus other launching points (dot-dashed lines and long dashed lines).

A dispersion map constructed according to the subject invention renders the zero-chirp locations independent of the dispersion values of the two types of fiber comprising the map, thus making the ideal launching points independent of frequency. Such special dispersion maps allow the amount of dispersive radiation shed by solitons in a WDM system to be reduced simultaneously over a range of frequencies without independent external adjustment or modulation, as shown in FIG. 4.

The design of such an optimized map follows by choosing the lengths of the fiber segments appropriately. The optimum lengths are chosen by using a theoretical estimate for the imbalance between the effects of the group velocity dispersion and nonlinear index of refraction and noting that when a particular ratio of lengths is chosen the result becomes independent of the group velocity dispersion of the fibers.

Recent laboratory and numerical experiments have demonstrated that dispersion management significantly improves soliton transmission system performance. This is mainly because concatenating fibers of both anomalous and normal dispersion to form a transmission line produces both a low path-averaged group-velocity dispersion (GVD) and a high local GVD; Gordon-Haus timing jitter and the four-wave mixing efficiency can then be reduced simultaneously. Considerable work has been devoted to understanding the potential performance gains to be obtained with dispersion-managed solitons and the optimization of systems employing them. System optimization involves many practical factors and is, therefore, a rather complicated issue. One important fact, however, is that pulses launched into the fiber should be properly shaped and chirped to minimize the shedding of dispersive radiation. From a practical point of view, of course, it is preferable to eliminate the need for pulse prechirping.

Generally, for a two-step dispersion map, dispersion-managed solitons in lossless fibers are unchirped at the midpoints of the fiber segments. In realistic systems, of course, pulses need to be amplified repeatedly due to fiber loss. A good understanding of the effects of various amplification schemes on the dynamics of dispersion-managed solitons is, therefore, very useful. The subject analytic approach is suitable for cases where there are a finite number of amplifiers in each dispersion-map period. The goal is to locate the optimal launch points for dispersion-managed solitons where no pulse prechirping is needed.

Pulse evolution in dispersion-managed optical fibers with loss and gain is governed by the nonlinear Schrödinger equation:

$$i\frac{\partial u}{\partial x} - \frac{1}{2}\sigma\left(\frac{z}{\varepsilon}\right)\frac{\partial^2 u}{\partial t^2} + g\left(\frac{z}{\varepsilon}\right)|u|^2 u = 0 \quad (1)$$

We apply a perturbation method in the limit when $\epsilon_c$ the ratio of the dispersion map period to the soliton dispersion length, is small in order to evaluate the local imbalance between the effects of dispersion and the nonlinear index of refraction (also known as self-phase modulation). From the explicit formula obtained, the positions may be calculated at which the local imbalance is zero and, thus, where the pulse is locally chirp-free.

Assuming that the group-velocity dispersion parameter of the segment after (before) the amplifier is $\sigma_1$ ($\sigma_2$), that the ratio of the first (second) segment length $l_1$ ($l_2$) to the map's period 1 is $\zeta_1=l_1/l$ ($\zeta_2=l_2/l=1-\zeta_1$), that the path-averaged group-velocity dispersion has been normalized to be $-1$, and that the amplifier gain is $G=\exp(_\alpha l)$ where $_\alpha$ is the fiber loss, we find that the distance between the amplifier and a chirp-free point on the segment after the amplifier, $\zeta_a$, can be determined as the solution of $$1 + \sigma_1 = \frac{2\Lambda G\exp(-2\Lambda\zeta_1 d) + (2\Lambda\zeta_1 d - 1 - \Lambda)(G - 1)}{2\Lambda\zeta_1 d(G - 1) - G + [\exp(2\Lambda\zeta_2) - \zeta_1]/\zeta_2}, \quad (2)$$

where $d=\zeta_a/\zeta_1$ ($0<d<1$) and $\Lambda=_\alpha l/2$ is the dimensionless loss coefficient. Similarly, the distance between the amplifier and a chirp-free point on the segment before the amplifier, $\zeta_b$, is given by the solution of $$\sigma_1 + 1 = \frac{2\Lambda\exp(-2\Lambda\zeta_2 d) + (2\Lambda\zeta_2 d - 1 - \Lambda)(G - 1)}{-2\Lambda\zeta_1 d(G - 1) - G + [\exp(2\Lambda\zeta_2) - \zeta_1]/\zeta_2}, \quad (3)$$

where $d=-\zeta_b/\zeta_2$ ($-1<d<0$). For a given dispersion map, there are, in general, two optimal launch points in each map period, but three or four optimal launch points are also possible for weaker dispersion maps.

The optical length of $\zeta_1$ and chirp-free location d in the first fiber segment are found by simultaneously solving for them in the equation:

$2\Lambda G \exp(-2\Lambda\zeta_1 d)+(2\Lambda_1 d-1-\Lambda)(G-1)=0$, $2\Lambda\zeta_1 d(G-1)-G+[\exp(2\Lambda\zeta_2)-\zeta_1]/\zeta_2=0$ where the optimal length $\zeta_2$ and chirp-free location d in the second fiber segment are found simultaneously solving for them in equations.

$2\Lambda \exp(-2\Lambda\zeta_2 d)+(2\Lambda\zeta_2 d-1-\Lambda)(G-1)=0$, $-2\Lambda\zeta_1 d(G-1)-G+[\exp(2\Lambda\zeta_2)-\zeta_1]/\zeta_2=0$ As an example, with the attenuation constant and dispersion-map period taken to be $\alpha=0.04605$ km$^{-1}$ (i.e., a 0.2 dB/km power loss) and l=120 km, the loss coefficient is then $\Lambda=2.763$. For $\zeta_1=0.225$ and $\sigma_1=-3.33$, Eqs. (2) and (3) predict that there are four optimal launch points, namely d=0.7099, 0.1442, −0.2587 and −0.8688. FIG. 3 shows the evolution of the chirp parameter b, which is a measure of the local imbalance between the dispersion and nonlinear self-phase modulation, when an unchirped hyperbolic-secant pulse is launched at the optimal point d=0.1442, taking $\epsilon=0.5$. Both the numerical (circles) and asymptotic (solid line) results are plotted in FIG. 3 for comparison. Clearly, the asymptotic theory provides a good prediction of the soliton behavior when this map is used.

Next consider a dispersion map using 100 km of normal dispersion fiber and 20 km of anomalous dispersion fiber with GVD coefficients of 2.76 and −20.1 ps$^2$/km, respectively, so that the averaged GVD is $<\beta>=-1.05$ ps$^2$/km. Suppose that the amplifier is deployed at the starting point of the anomalous dispersion segment; we then have $\zeta_1=\frac{1}{6}$, $\sigma_1=-19.1$. For a 35 ps FWHM pulse, it can be calculated that $\epsilon=0.406$ and taking $\Lambda=2.763$, we find from Eqs. (2) and (3) that d=0.567 and −0.611. This means that there are two optimal launch points: one at 11.3 km after the amplifier and the other at 61.1 km before the amplifier (on the anomalous dispersion and the normal dispersion segments, respectively).

A practical implementation exploiting the use of these optimal chirp-free points can be constructed merely by using a portion of one dispersion map period before the first amplifier to aid in the launching of the optical pulses. In the previous example, the dispersion map period is 120 km (20 km of anomalous dispersion fiber and 100 km of normal dispersion fiber), and for the parameters chosen there are two optimal chirp-free points, one at 11.3 km after the amplifier (in the anomalous dispersion fiber) and the other at 61.1 km before the amplifier (in the normal dispersion fiber). If the first chirp-free point is chosen as the launch point, one merely constructs a partial dispersion map period of total length 108.7 km comprising of 8.7 km (=20−11.3) of anomalous dispersion fiber and 100 km of normal dispersion fiber. If the second chirp-free point is chosen as the launch point, the partial dispersion map has total length 61.1 km and comprises just 61.1 km of normal dispersion fiber. Either of these fiber lengths or partial dispersion maps can be used as a passive device to be installed before the first amplifier to reduce the amount of dispersive radiation generated by the propagating pulses, as shown in FIG. 2.

Furthermore, when optimal lengths of fiber used to construct the map are chosen optimally so as to make the numerator and denominator of Eqs. (2) or (3) zero simultaneously, then one obtains a special dispersion map in which the position of one of the chirp-free points becomes independent of the dispersion parameters of the fiber making up the dispersion map and, therefore independent of the signal wavelength, since the group velocity dispersion depends upon the wavelength. In the example given previous with an amplifier spacing of 120 km and a loss parameter of $\Lambda=2.763$, requiring the numerator and denominator of Eq. (2) to be zero simultaneously gives $\zeta_1=0.1762$ and d=0.5593, meaning that if the first length of fiber is taken to be 0.1762×120=21.1 km long, then a wavelength-independent chirp-free point is located 0.5593×21.1=11.8 km into this first length of fiber. A similar wavelength-independent chirp-free point results in the second fiber segment by requiring the numerator and denominator of Eq. (3) to be zero simultaneously. By employing one of these specially-constructed dispersion maps, it is, therefore, possible to optimize the transmission of several wavelengths simultaneously, as shown in FIG. 4. Such special dispersion maps are particularly suited for use as passive performance-enhancing devices in systems employing wavelength division multiplexing.

Thus, the invention involves a method of minimizing dispersive radiation in an optical fiber transmission system utilizing solitons with at least a first and a second type of optical fibers and an amplifier. The method comprises first, determining a first optimal length of said first type optical fiber to form a first length of optical fiber; then determining a second optimal length of said second type optical fiber to form a second length of optical fibers to form a first dispersion map. The first and second optimal lengths are those lengths where the net amount of chirp accumulated before and the net amount of chirp accumulated after said zero chirp point balance one another for all wavelengths and may be determined by the formula set forth above. An amplifier is then located after every said dispersion map. Points in the dispersion map connected to the amplifier are then located where the pulse chirp is zero. A plurality of dispersion maps and amplifiers are connected to form in a transmission line; the first dispersion map is said transmission line is then cut at the zero chirp point to create an optimal launch point for all wavelengths in the transmission line.

A prechirping fiber may be prepared by first determining a first optimal length of a first type of optical fiber and a second optimal length of a second type optical fiber; the first and second optimal lengths are, as before, those lengths where the net amount of chirp accumulated before and the net amount of chirp accumulated after the zero chirp point balance one another for all wavelengths. The first length is connected to the second length to form a dispersion map. An amplifier is located after the dispersion map, and the pulse chirp zero points in the dispersion map connected to the amplifier is determined. The dispersion map is cut at a zero chirp point to create an optimal prechirping fiber for all wavelengths.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and equivalents falling within the scope of the to appended claims.

We claim:

1. A method of minimizing dispersive radiation in an optical fiber transmission system utilizing solitons and having at least a first and second type of optical fibers and an amplifier comprising the steps of:
    1.) determining a first optimal length of said first type optical fiber to form a first length of optical fiber;
    2.) determining a second optimal length of said second type optical fiber to form a second length of optical fiber,
    3.) connecting the optimal lengths of said first and second type of optical fibers to form a first dispersion map;
    4.) locating an amplifier after every said dispersion map;
    5.) locating points in the dispersion map connected to the amplifier where the pulse chirp is zero;
    6.) said first and second optimal lengths being those lengths where the net amount of chirp accumulated before and the net amount of chirp accumulated after said zero chirp point balance one another for all wavelengths;
    7.) repeating steps 3 and 4 to form a plurality of dispersion maps and amplifiers in a transmission line; and,
    8.) cutting the first dispersion map in said transmission line at said zero chirp point to create an optimal launch point for all wavelengths in said transmission line.

2. The method of claim 1 wherein said optimal length $\zeta_1$ and chirp-free location d in the first fiber segment are found by simultaneously solving for them in the equations:

$$2\Lambda G \exp(-2\Lambda\zeta_1 d)+(2\Lambda\zeta_1 d-1-\Lambda)(G-1)=0,$$

$$2\Lambda\zeta_1 d(G-1)-G+[\exp(2\Lambda\zeta_2)-\zeta_1]/\zeta_2=0,$$

where the optimal length $\zeta_2$ and chirp-free location d in the second fiber segment are found by simultaneously solving for them in the equations $$2\Lambda\exp(-2\Lambda\zeta_2 d)+(2\Lambda\zeta_2 d-1-\Lambda)(G-1)=0,$$

$$-2\Lambda\zeta_1 d(G-1)-G+[\exp(2\Lambda\zeta_2)-\zeta_1]/\zeta_2=0$$

where
    $\Lambda$ is the dimensionless fiber loss $\Lambda=\alpha l/2$; and
    G is the amplifier gain, $G=\exp(\alpha l)$ where $\alpha$ is fiber loss and l is the spacing between amplifiers.

3. A method of managing dispersion in a wavelength division multiplexed soliton transmission system comprising the steps of:
    1.) determining a first optimal length of a first type of optical fiber;
    2.) determining a second optimal length of a second type optical fiber;
    3.) connecting said first length to said second length to form a dispersion map;
    4.) locating an amplifier after said dispersion map;
    5.) determining the pulse chirp zero point in said dispersion map;
    6.) said first and second optimal lengths are those where the net amount of chirp accumulated before and the net amount of chirp accumulated after said zero chirp point balance one another for all wavelengths;
    7.) cutting the dispersion map at said zero chirp point to create an optimal prechirping fiber for all wavelengths.

4. The method of claim 3, wherein the prechirping fiber is connected to the beginning of a transmission line comprising a plurality of said dispersion maps and said amplifiers.

5. The method of claim 4, wherein said plurality of dispersion maps are constructed as in steps 1–6 of claim 3.

6. A method of managing dispersion in a wavelength division multiplexed soliton transmission system comprising the steps of:
    1. determining a first optimal length of a first type of optical fiber;
    2. determining a second optimal length of a second type optical fiber;
    3. connecting said first length to said second length to form a dispersion map;
    4. locating an amplifier after said dispersion map;
    5. determining the pulse chirp zero point in said dispersion map;
    6. said first and second optimal lengths being those of said lengths where the net amount of chirp accumulated before and the net amount of chirp accumulated after said zero chirp point balance one another for all wavelengths; and
    7. cutting the dispersion map at said zero chirp point to create an optimal launch point for all wavelengths.

7. The method of claim 6 further including the steps of repeating steps 3 and 4 connecting said dispersion maps to form a transmission line.

8. The method of claim 7 further including the step of connecting said optimal prechirped fiber to said transmission line.

9. The method of claim 7 wherein said optimal length is found by solving for d in the equation:

$$2\Lambda G \exp(-2\Lambda\zeta_1 d)+(2\Lambda\zeta_1 d-1-\Lambda)(G-1)=0$$

$$2\Lambda\zeta_1 d(G-1)-G+[\exp(2\Lambda\zeta_2)-\zeta_1]/\zeta_2=0$$

or where optimal length $\zeta_2$ and chirp-free location d in the second fiber segment are found by simultaneously solving for them in equations $$2\Lambda \exp(-2\Lambda\zeta_2 d)+(2\Lambda\zeta_2 d-1-\Lambda)(G-1)=0,$$

$$-2\Lambda\zeta_1 d(G-1)-G+[\exp(2\Lambda\zeta_2)-\zeta_1]/\zeta_2=0$$

where
    $\Lambda$ is the dimensionless fiber loss $\Lambda=\alpha l/2$; and
    G is the amplifier gain, $G=\exp(\alpha l)$ where $\alpha$ is fiber loss and l is the spacing between amplifiers.

* * * * *